United States Patent [19]

Pfeifer et al.

[11] 4,377,683
[45] Mar. 22, 1983

[54] TRANSPARENT COPOLYAMIDE FROM ISOPHORONE DIAMINE AND SUBSTITUTED UNDECANE DIAMINE

[75] Inventors: Josef Pfeifer, Therwil, Switzerland; Dieter Reinehr, Kandern, Fed. Rep. of Germany

[73] Assignee: Ciba-Geigy Corporation, Ardsley, N.Y.

[21] Appl. No.: 272,866

[22] Filed: Jun. 12, 1981

[30] Foreign Application Priority Data

Jun. 23, 1980 [CH] Switzerland ................. 4806/80

[51] Int. Cl.³ ........................................... C08G 69/26
[52] U.S. Cl. .................... 528/336; 528/338; 528/339; 528/340; 528/346; 528/347; 528/349
[58] Field of Search ............. 528/349, 338, 339, 340, 528/346, 347, 336

[56] References Cited

U.S. PATENT DOCUMENTS

| | | | |
|---|---|---|---|
| 3,173,898 | 3/1965 | Sum | 260/78 |
| 3,294,759 | 12/1966 | Gabler | 528/339 |
| 3,352,831 | 11/1967 | Schmitt et al. | 260/78 |
| 3,352,834 | 11/1967 | Schmitt et al. | 260/78 |
| 3,352,942 | 11/1967 | Schmitt et al. | 260/857 |
| 3,627,736 | 12/1971 | Raum et al. | 260/78 R |
| 4,258,176 | 3/1981 | Pfeifer et al. | 528/338 |

FOREIGN PATENT DOCUMENTS

| | | |
|---|---|---|
| 977868 | 12/1964 | United Kingdom. |
| 1125770 | 8/1968 | United Kingdom. |
| 1228762 | 4/1971 | United Kingdom. |
| 1255483 | 12/1971 | United Kingdom. |
| 1268374 | 3/1972 | United Kingdom. |
| 1305786 | 2/1973 | United Kingdom. |
| 1410006 | 10/1975 | United Kingdom. |
| 1410007 | 10/1975 | United Kingdom. |

OTHER PUBLICATIONS

CA, 93, 168846z (1980) (=AN).
CA, 52, 19161c (1958) (=AF).
CA, 46, 132f (1952) (=AH).
CA, 72, 91104n (1970) (=AN).
CA, 90, 104626h (1979) (=AO).

Primary Examiner—Harold D. Anderson
Attorney, Agent, or Firm—Luther A. R. Hall

[57] ABSTRACT

Transparent copolyamides are obtained by reacting a mixture (A) of isophoronediamine and isophthalic acid, terephthalic acid or a mixture of isophthalic acid and terephthalic acid with a mixture (B) of a diamine

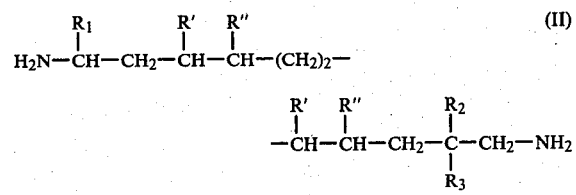

and terephthalic acid or a mixture of terephthalic acid and isophthalic acid or with a mixture (C) of a diamine

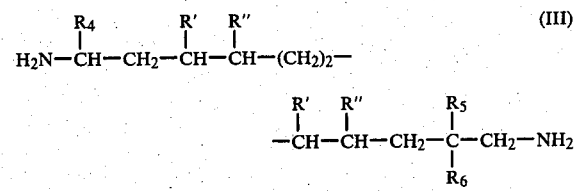

and terephthalic acid or isophthalic acid or mixtures thereof, R', R" and $R_1$ to $R_6$ being as defined in the patent claim.

The reaction can also be carried out with an excess of diamine and with addition of $H_3PO_2$ or salts thereof or white phosphorus.

The novel copolyamides are distinguished by good thermoplastic processability, low water absorption and good resistance to hydrolysis, and are useful for the production of transparent mouldings.

10 Claims, No Drawings

TRANSPARENT COPOLYAMIDE FROM ISOPHORONE DIAMINE AND SUBSTITUTED UNDECANE DIAMINE

The present invention relates to novel transparent copolyamides and to their use for the production of mouldings.

Transparent copolyamides produced from 3-aminomethyl-3,5,5-trimethylcyclohexylamine (isophoronediamine), additional diamines and aromatic dicarboxylic acids are known. For example, British Patent Specification No. 1,410,006 describes copolyamides obtained from isophoronediamine, polymethylenediamine having 11 to 14 C atoms, and terephthalic acid. British Patent Specification No. 1,255,483 describes other transparent copolyamides, obtained from isophoronediamine, a branched aliphatic diamine having 7 to 12 C atoms in the main chain, and dicarboxylic acids, such as terephthalic acid, isophthalic acid or mixtures of these.

There continues to be a need for transparent copolyamides having improved properties. We have now found novel transparent copolyamides obtained from an aromatic dicarboxylic acid, isophoronediamine and long-chain, branched aliphatic diamines.

Accordingly, the present invention provides a transparent copolyamide obtainable by reacting a diamine of the formula I

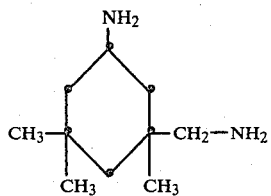

and an aliphatic diamine with isophthalic acid or terephthalic acid or amide-forming derivatives thereof or with a mixture of isophthalic acid and terephthalic acid or amide-forming derivatives thereof, which copolyamide has a reduced specific viscosity of not less than 0.5 dl/g, measured on an 0.5% solution in m-cresol at 25° C., and is obtained by reacting a mixture (A) of the diamine of the formula I and isophthalic acid or terephthalic acid or mixtures or amide-forming derivatives thereof either with a mixture (B) of an aliphatic diamine of the formula II

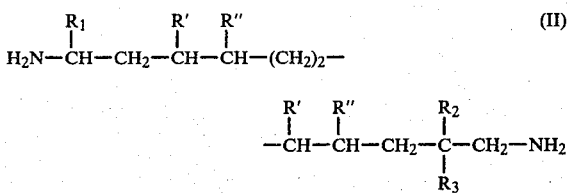

and terephthalic acid or an amide-forming derivative thereof or a mixture of terephthalic acid and isophthalic acid or amide-forming derivatives thereof in a molar ratio of terephthalic acid or derivative: isophthalic acid or derivative of 8:2 to 10:0 or with a mixture (C) of an aliphatic diamine of the formula III

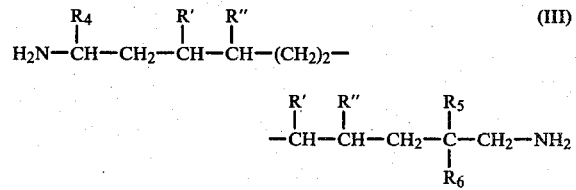

and terephthalic acid or isophthalic acid or mixtures or amide-forming derivatives thereof, in which formulae R' and R", independently of one another, are each hydrogen or methyl, $R_1$ is alkyl having 2-12 C atoms or is substituted or unsubstituted aryl, $R_2$ is alkyl having 1-8 C atoms, $R_3$ is hydrogen or alkyl having 1-5 C atoms, $R_4$ is unsubstituted or $C_{1-4}$-alkyl-substituted cycloalkyl having 5-12 ring C atoms, $R_5$ is hydrogen or methyl and $R_6$ is methyl or $R_5$ and $R_6$ together are alkylene having 4-11 C atoms, the proportion of mixture (C) being 60-80 percent by weight and the proportion of mixture (B) being 50-80 percent by weight, relative to the total weight of the reactants, and these percentages by weight relating, in the case of amide-forming derivatives of isophthalic acid or terephthalic acid, to identical functional groups.

The copolyamides according to the invention have a glass-clear appearance and a high glass transition temperature and consequently high heat distortion point, but can nevertheless very easily be processed as thermoplastics, for example by injection moulding or extrusion. Furthermore, they are distinguished by reduced water absorption, good resistance to hydrolysis, resistance to boiling water and little effect of moisture on the mechanical and electrical properties.

Alkyl groups $R_1$, $R_2$ and $R_3$, and alkyl substituents on cycloalkyl groups $R_4$, can be straight-chain or branched. Examples of such alkyl groups are the methyl, ethyl, n-propyl, isopropyl, n-, sec.- and tert.-butyl, n-pentyl, 2- or 3-pentyl, n-hexyl, 2- or 3-heptyl, n-octyl, n-decyl or n-dodecyl group, except that $R_1$ cannot be methyl.

If $R_1$ is substituted aryl, suitable substituents are, in particular, alkyl groups having 1-4 C atoms and especially 1 or 2 C atoms. Aryl groups $R_1$ can carry several alkyl groups, but are preferably substituted by only one alkyl group. Particularly preferred meanings of $R_1$ are the 1- or 2-naphthyl group, phenyl which is substituted by one alkyl group having 1-4, especially 1 or 2, C atoms, and, most preferredly, unsubstituted phenyl.

If $R_1$ is an alkyl group as defined above, it is especially straight-chain alkyl having 2-6 C atoms or a radical $-CH(R_7)(R_8)$, in which $R_7$ is alkyl having 1-4 C atoms and $R_8$ is alkyl having 1-6 C atoms. The said alkyl groups $R_7$ and $R_8$ preferably have straight chains and are in particular methyl, ethyl, n-propyl or n-butyl.

Alkylene groups formed by $R_5$ and $R_6$ advantageously have straight chains and preferably have 4-7 C atoms. In particular, alkylene can be tetramethylene, heptamethylene and most preferredly pentamethylene.

Alkyl groups $R_2$ and $R_3$ advantageously have straight chains and advantageously have 1-6 and 1-4 C atoms respectively. Particularly preferred meanings of $R_2$ and $R_3$, independently of one another, are methyl, ethyl, n-propyl or n-butyl.

Where a cycloalkyl group $R_4$ is substituted by alkyl groups, the substituent is especially methyl or ethyl. Preferably, however, cycloalkyl groups $R_4$ are unsubstituted and have 5-8 ring C atoms. A particularly preferred meaning of $R_4$ is cyclopentyl, and the most preferred meaning is cyclohexyl.

Preferred copolyamides according to the invention, obtainable by reacting a mixture (A) with a mixture (B) or (C) are those from mixtures, (A), (B) and (C) of essentially stoichiometric amounts of the diamine and the dicarboxylic acid or amide-forming derivatives thereof.

Particularly preferred copolyamides according to the invention are those obtainable by reacting a mixture (A) with a mixture (B) of essentially stoichiometric amounts of terephthalic acid, or an amide-forming derivative thereof, and a diamine of the formula II, in which $R'$ and $R''$ are each hydrogen, $R_1$ is phenyl, straight-chain alkyl having 1-6 C atoms or —CH($R_7$)($R_8$), $R_2$ and $R_8$ independently of one another are alkyl having 1-6 C atoms and $R_3$ and $R_7$ independently of one another are alkyl having 1-4 C atoms, the proportion of mixture (B) being 50-75 percent by weight, relative to the total weight of the reactants. Especially preferred copolyamides of the above type are those in which $R'$ and $R''$ are each hydrogen, $R_1$ is —CH($R_7$)($R_8$) and $R_2$ and $R_8$, and $R_3$ and $R_7$, are each methyl, ethyl, n-propyl or n-butyl, and the proportion of mixture (B) is 55-75 percent by weight, relative to the total weight of the reactants. Very particularly preferred copolyamides are those of the above type, in which $R_1$ is —CH($R_7$)($R_8$) and $R_2$, $R_3$, $R_7$ and $R_8$ are each methyl, and the proportion of mixture (B) is 70 percent by weight.

Further preferred copolyamides are those which are obtained by reacting a mixture (A) of essentially stoichiometric amounts of a diamine of the formula I and terephthalic acid or an amide-forming derivative thereof with a mixture (C) of essentially stoichiometric amounts of terephthalic acid or an amide-forming derivative thereof and a diamine of the formula III, in which $R'$ and $R''$ are each hydrogen, $R_4$ is cycloalkyl having 5-8 ring C atoms and $R_5$ and $R_6$ are each methyl or together are alkylene having 4-7 C atoms, and the proportion of mixture (C) is 65-75 percent by weight, relative to the total weight of the reactants, and more especially copolyamides of the above type, in which $R'$ and $R''$ are each H, $R_4$ is cyclopentyl and $R_5$ and $R_6$ together are tetramethylene, or $R_4$ is cyclohexyl and $R_5$ and $R_6$ together are pentamethylene, and the proportion of mixture (C) is 65-75 percent by weight, relative to the total weight of the reactants.

Particularly preferred copolyamides are obtained by reacting a mixture (A) of essentially stoichiometric amounts of a diamine of the formula I and terephthalic acid or an amide-forming derivative thereof with a mixture (B) of essentially stoichiometric amounts of a diamine of the formula IIa

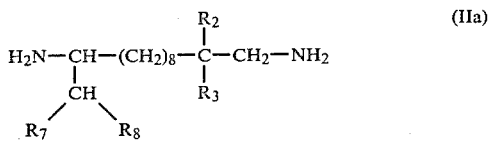

(IIa)

in which $R_2$, $R_3$, $R_7$ and $R_8$ are each methyl or ethyl, and terephthalic acid or an amide-forming derivative thereof, the proportion of mixture (B) being 60-75 percent by weight if $R_2$, $R_3$, $R_7$ and $R_8$ are methyl, and 50-65 percent by weight if $R_2$, $R_3$, $R_7$ and $R_8$ are ethyl, the percentage in each case being relative to the total weight of the reactants.

Examples of suitable amide-forming derivatives of terephthalic acid or isophthalic acid are the corresponding dihalides, especially the dichlorides, as well as the dinitriles, dialkyl esters and diaryl esters, especially dialkyl esters in which each alkyl moiety has 1-4 C atoms, and diphenyl esters.

The reaction of the reactants defined above can be carried out according to methods known per se. A preferred method of preparation is a multi-stage melt polycondensation process. In this, the diamines are precondensed with the dicarboxylic acids in a closed vessel, with or without addition of water, under an inert gas, at temperatures of between about 240° and 290° C. Under certain circumstances it can be advantageous to employ the diamines and the dicarboxylic acids as salts. The salts to be employed for the precondensation can be prepared from essentially stoichiometric amounts of terephthalic acid or isophthalic acid and a diamine of the formula I, II or III, in a suitable inert organic solvent. Examples of such solvents are cycloaliphatic alocohols, such as cyclopentanol and cyclohexanol, and especially aliphatic alcohols having up to 6 C atoms, such as methanol, ethanol, n-propanol, butanols, pentanols and hexanols, and mixtures of such solvents with water. The precondensate can subsequently be condensed further at temperatures of between about 260° and 300° C., under normal pressure and in an inert gas atmosphere, until the copolyamides according to the invention are formed. Under certain circumstances it can be advantageous to apply vacuum after completion of the polycondensation, so as to degas the copolyamide.

The copolyamides according to the invention can also be prepared by melt condensation or solvent polycondensation of diamines of the formula I, II or III with an activated ester of isophthalic acid, terephthalic acid or mixtures thereof. Suitable activated esters are, in particular, the corresponding diphenyl esters. The temperatures for this reaction are in general between about 230° and 300° C.

Conventional additives, such as heat stabilisers and light stabilisers, antioxidants, colorants, flame-proofing agents and the like, can be added to the copolyamides according to the invention during their preparation of during moulding. In order to obtain colourless copolyamides, 30-3,000 ppm of $H_3PO_2$ or salts thereof, for example ammonium phosphite, or 15-1,000 ppm of white phosphorus ($P_4$) can be added to the copolyamides according to the invention, during their preparation, whilst at the same time using an excess of diamines in the reaction mixture (ppm stands for parts per million). The amounts stated are relative to the total weight of the reactants.

Accordingly, copolyamides which are obtainable by reacting a mixture (A) with a mixture (B) or (C), with at least one of the mixtures (A), (B) and (C) containing the diamine in excess, and with the reaction being carried out in the presence of $H_3PO_2$ or salts thereof or white phosphorus, are also preferred. Copolyamides of the abovementioned type, which are obtainable by a reaction with addition of 30-3,000 ppm of $H_3PO_2$ or salts thereof or 15-1,000 ppm of white phosphorus, in each case relative to the total weight of the reactants, are particularly preferred.

The diamine of the formula I is known and can be prepared by methods known per se. The diamines of the formulae II and III, and their preparation, are described in European Patent Al 0,010,521.

The copolyamides according to the invention can be converted, by methods per se, to transparent mouldings of very diverse types, such as transparent appliances or components of appliances.

EXAMPLE 1

Preparation of salts of terephthalic acid or isophthalic acid and 1,11-diaminoundecanes of the formula II or III 0.1 mol of terephthalic acid or isophthalic acid in 300 ml of 70% ethanol is heated to the boil in a round flask equipped with a stirrer, reflux condenser and dropping funnel. 0.1 mol of diamine of the formula II or III is run from the dropping funnel into the boiling stirred suspension in the course of about 10 minutes, and residual diamine adhering to the dropping funnel is rinsed quantitatively into the reaction mixture with a small amount of ethanol. The resulting clear solution is allowed to cool, with constant stirring, and the salt which precipitates is filtered off and dried in vacuo at 90° C. The following salts are prepared by this method:

| Code | Composition |
|---|---|
| Salt A | 1-Isopropyl-10,10-dimethyl-1,11-diaminoundecane/TPA |
| Salt B | 1-Cyclohexyl-10-pentamethylene-1,11-diaminoundecane/IPA |
| Salt D | 1-Ethyl-10,10-dimethyl-1,11-diaminoundecane/TPA |
| Salt E | 1-(3-Pentyl)-10,10-diethyl-1,11-diaminoundecane/TPA |
| Salt F | 1-Cyclohexyl-10,10-dimethyl-1,11-diaminoundecane/TPA |
| Salt G | 1-Phenyl-10-ethyl-10-n-butyl-1,11-diaminoundecane/TPA |
| Salt H | 1-Phenyl-10-methyl-1,11-diaminoundecane/TPA |
| Salt J | 1-n-Hexyl-10,10-dimethyl-1,11-diaminoundecane/TPA |

TPA = terephthalic acid
IPA = isophthalic acid.

EXAMPLE 2

Preparation of a salt of isophoronediamine and terephthalic acid (Salt C)

0.1 mol of terephthalic acid in 300 ml of 60% ethanol is heated to the boil in a round flask equipped with a stirrer, reflux condenser and dropping funnel. 0.1 mol of isophoronediamine is run from the dropping funnel into the boiling stirred suspension in the course of about 10 minutes, and residual diamine adhering to the dropping funnel is rinsed quantitatively into the reaction mixture with a small amount of ethanol. The resulting clear solution is allowed to cool, with constant stirring, and the salt which precipitates is filtered off and dried in vacuo at 90° C. Yield 75% of theory.

EXAMPLES 3–13

The following components are weighed into a bomb tube which is fitted with a screw cap with built-in pressure relief valve: a % by weight of salt C and (100−a) % by weight of salt of Example 1.

The closed bomb tube, containing the mixture under a nitrogen atmosphere, is dipped for one hour into a heating bath which is at a temperature of 270° C., in the course of which a clear melt is gradually produced, with elimination of water. When the tube has been cooled to room temperature (20°–25° C.), the solidified melt is taken out of the tube and is heated for 5 hours at 270° C. in a glass flask in the absence of air, and with continuous passage of nitrogen. The stream of nitrogen continuously removes the water of condensation from the reaction vessel. On cooling, the copolyamide solidifies to a glass-clear mass.

2–3 g portions of the copolyamides obtained are pressed in a heated hydraulic press at 270° C. to give a sheet which is about 0.4–1 mm thick. To determine the water absorption, the sheets are exposed to a relative atmospheric humidity of 65% at room temperature until equilibrium has been established, i.e. until no further weight increase is detectable. Depending on the sheet thickness, the time this requires varies between about 10 and 60 days. Table 1 shows the composition and properties of the copolyamides.

The reduced viscosity $\eta_{red.} = \eta rel./c$ is based on measurements on an 0.5% solution of the copolyamide in m-cresol at 25° C. The glass transition temperatures are measured in a differential scanning calorimeter (DSC). The water absorption values are saturation values at room temperature. The persistence of transparency in boiling water is very good for all the copolyamides, i.e. even after several days no reduction in transparency is detectable.

TABLE 1

| Example No. | Composition Salt | % by weight | $\eta_{red}$ dl/g | Glass transition temperature, °C. | Water absorption at 65% relative atmospheric humidity % by weight |
|---|---|---|---|---|---|
| 3 | A | 60 | 1.01 | 181 | 2.3 |
|  | C | 40 |  |  |  |
| 4 | A | 65 | 1.05 | 174 | 2.1 |
|  | C | 35 |  |  |  |
| 5 | A | 70 | 1.07 | 168 | 1.9 |
|  | C | 30 |  |  |  |
| 6 | B | 67 | 1.02 | 173 | 2.0 |
|  | C | 33 |  |  |  |
| 7 | D | 70 | 1.57 | 163 | 2.0 |
|  | C | 30 |  |  |  |
| 8 | D | 62 | 1.22 | 173 | 2.4 |
|  | C | 38 |  |  |  |
| 9 | E | 66 | 0.76 | 160 | 1.6 |
|  | C | 34 |  |  |  |
| 10 | F | 71 | 0.67 | 173 | 0.95 |
|  | C | 29 |  |  |  |
| 11 | G | 62 | 0.93 | 160 | 1.9 |
|  | C | 38 |  |  |  |
| 12 | H | 70 | 0.98 | 162 | 1.8 |
|  | C | 30 |  |  |  |
| 13 | J | 60 | 0.96 | 161 | 2.1 |
|  | C | 40 |  |  |  |

EXAMPLES 14–23

The examples which follow show the effect of a phosphorus-containing additive when using various ratios of the reactants.

A mixture of 20.0 millimols of 1,11-diamino-1-isopropyl-10,10-dimethylundecane, 10.2 millimols of isophoronediamine, 30.2 millimols of terephthalic acid and one or more of the additives listed in Table 2 is weighed into a bomb tube and sealed in under nitrogen. The precondensation in the sealed bomb tube and the polycondensation in an open vessel under nitrogen are carried out under the conditions described in Example 3. The results are summarised in Table 2.

TABLE 2

| Example | Additive I[1] | Additive II[2] | $\eta_{red}$ dl/g | Appearance | End groups in the polyamide (milli equivalents/g) NH$_2$ | COOH |
|---|---|---|---|---|---|---|
| 14 | 1,000 ppm of NH$_4$H$_2$PO$_2$ | — | 1.07 | pale yellow | 0.032 | 0.035 |
| 15 | 1,000 ppm of NH$_4$H$_2$PO$_2$ | 2 mol % of IPD[3] | 1.03 | colourless | 0.102 | 0.016 |
| 16 | 1,000 ppm of NH$_4$H$_2$PO$_2$ | 1 mol % of TPA[4] | 0.95 | yellow | 0.010 | 0.075 |
| 17 | 500 ppm of NH$_4$H$_2$PO$_2$ | 2 mol % of IPD | 1.34 | colourless | | |
| 18 | 250 ppm of NH$_4$H$_2$PO$_2$ | 2 mol % of IPD | 1.06 | colourless | | |
| 19 | 250 ppm of H$_3$PO$_2$ | 2 mol % of IPD | 1.09 | colourless | 0.08 | 0.005 |
| 20 | 250 ppm of H$_3$PO$_2$ | — | 1.28 | yellowish | 0.012 | 0.040 |
| 21 | 80 ppm of white phosphorus | 2 mol % of IPD | 1.04 | colourless | 0.09 | 0.012 |
| 22 | — | 2 mol % of IPD | 1.15 | pale yellow | 0.11 | 0.02 |
| 23 | — | — | 1.07 | yellow | 0.042 | 0.046 |

[1] Amounts in ppm relative to total components
[2] Amounts in mol % relative to terephthalic acid
[3] IPD = isophoronediamine
[4] TPA = terephthalic acid

What is claimed is:

1. A thermoplastic, transparent copolyamide obtained by reacting a diamine of the formula I

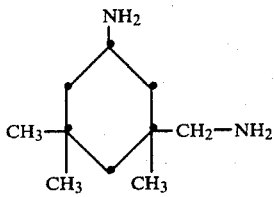

and an aliphatic diamine with isophthalic acid or terephthalic acid or amide-forming derivatives thereof or with a mixture of isophthalic acid and terephthalic acid or amide-forming derivatives thereof, which copolyamide has a reduced specific viscosity of not less than 0.5 dl/g, measured on an 0.5% solution in m-cresol at 25° C., and is obtained by reacting a mixture (A) of the diamine of the formula I and isophthalic acid or terephthalic acid or mixtures or amide-forming derivatives thereof either with a mixture (B) of an aliphatic diamine of the formula II

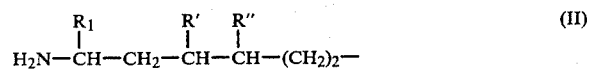  (II)

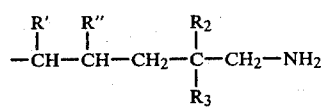

and terephthalic acid or an amide-forming derivative thereof or a mixture of terephthalic acid and isophthalic acid or amide-forming derivatives thereof in a molar ratio of terephthalic acid or derivative: isophthalic acid or derivative of 8:2 to 10:0 or with a mixture C of an aliphatic diamine of the formula III

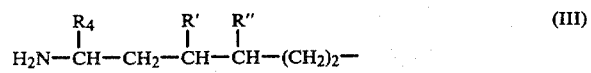  (III)

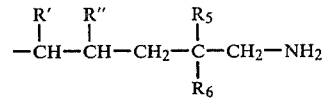

and terephthalic acid or isophthalic acid or mixtures or amide-forming derivatives thereof, in which formulae R' and R", independently of one another, are each hydrogen or methyl, $R_1$ is alkyl having 2–12 C atoms or is substituted or unsubstituted aryl, $R_2$ is alkyl having 1–8 C atoms, $R_3$ is hydrogen or alkyl having 1–5 C atoms, $R_4$ is unsubstituted or $C_{1-4}$-alkyl-substituted cycloalkyl having 5–12 ring C atoms, $R_5$ is hydrogen or methyl and $R_6$ is methyl or $R_5$ and $R_6$ together are alkylene having 4–11 C atoms, the proportion of mixture (C) being 60–80 percent by weight and the proportion of mixture (B) being 50–80 percent by weight, relative to the total weight of the reactants, and these percentages by weight relating, in the case of amide-forming derivatives of isophthalic acid or terephthalic acid, to identical functional groups.

2. A thermoplastic, transparent copolyamide according to claim 1, obtained by using mixtures (A), (B) and (C) which consist of essentially stoichiometric amounts of the diamine and the dicarboxylic acid or amide-forming derivatives.

3. A thermoplastic, transparent copolyamide according to claim 2, obtained by reacting a mixture (A) with a mixture (B) of terephthalic acid or an amide-forming derivative thereof and a diamine of the formula II, in which R' and R" are each hydrogen, $R_1$ is phenyl, straight-chain alkyl having 2–6 C atoms or —CH($R_7$)($R_8$), $R_2$ and $R_8$ independently of one another are alkyl having 1–6 C atoms and $R_3$ and $R_7$ independently of one another are alkyl having 1–4 C atoms, the proportion of mixture (B) being 50–75 percent by weight, relative to the total weight of the reactants.

4. A thermoplastic, transparent copolyamide according to claim 3, wherein $R_1$ is —CH($R_7$)($R_8$) and $R_2$ and $R_8$, and $R_3$ and $R_7$, are each methyl, ethyl, n-propyl or n-butyl, and the proportion of mixture (B) is 55–75 percent by weight, relative to the total weight of the reactants.

5. A thermoplastic, transparent copolyamide according to claim 3, in which $R_1$ is —CH($R_7$)($R_8$) and $R_2$, $R_3$, $R_7$ and $R_8$ are each methyl and the proportion of mixture (B) is 70 percent by weight, relative to the total weight of the reactants.

6. A thermoplastic, transparent copolyamide according to claim 2, obtained by reacting a mixture (A) of a diamine of the formula I and terephthalic acid or an amide-forming derivative thereof with a mixture (C) of terephthalic acid or an amide-forming derivative thereof and a diamine of the formula III, in which R' and R'' are each hydrogen, $R_4$ is cycloalkyl having 5–8 ring C atoms and $R_5$ and $R_6$ are each methyl or together are alkylene having 4–7 C atoms, and the proportion of mixture (C) is 65–75 percent by weight, relative to the total weight of the reactants.

7. A thermoplastic, transparent copolyamide according to claim 6, in which R' and R'' are each hydrogen, $R_4$ is cyclopentyl and $R_5$ and $R_6$ together are tetramethylene or $R_4$ is cyclohexyl and $R_5$ and $R_6$ together are pentamethylene.

8. A thermoplastic, transparent copolyamide according to claim 2, obtained by reacting a mixture (A) of a diamine of the formula I and terephthalic acid or an amide-forming derivative thereof with a mixture (B) of a diamine of the formula IIa

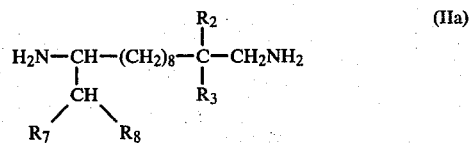

in which $R_2$, $R_3$, $R_7$ and $R_8$ are each methyl or ethyl, and terephthalic acid or an amide-forming derivative thereof, the proportion of mixture (B) being 60–75 percent by weight if $R_2$, $R_3$, $R_7$ and $R_8$ are methyl, and 50–65 percent by weight if $R_2$, $R_3$, $R_7$ and $R_8$ are ethyl, the percentage in each case being relative to the total weight of the reactants.

9. A thermoplastic, transparent, colorless copolyamide according to claim 1, obtained by reacting a mixture (A) with a mixture (B) or (C), with at least one of the mixtures (A), (B) and (C) containing the diamine in excess, and with the reaction being carried out in the presence of $H_3PO_2$ or salts thereof or white phosphorus.

10. A thermoplastic, transparent, colorless copolyamide according to claim 8, obtained by a reaction with addition of 30–3,000 ppm of $H_3PO_2$ or salts thereof or 15–1,000 ppm of white phosphorus, in each case relative to the total weight of the reactants.

* * * * *